(12) United States Patent
Yokota et al.

(10) Patent No.: US 12,043,691 B2
(45) Date of Patent: Jul. 23, 2024

(54) PETROLEUM RESIN, HYDROGENATED PETROLEUM RESIN, AND PRODUCTION METHOD FOR HYDROGENATED PETROLEUM RESIN

(71) Applicant: IDEMITSU KOSAN CO., LTD., Tokyo (JP)

(72) Inventors: Kiyohiko Yokota, Ichihara (JP); Kenji Kobayashi, Ichihara (JP); Masakatsu Kuroki, Pasir Gudang (MY)

(73) Assignee: IDEMITSU KOSAN CO., LTD., Tokyo (JP)

(*) Notice: Subject to any disclaimer, the term of this patent is extended or adjusted under 35 U.S.C. 154(b) by 958 days.

(21) Appl. No.: 16/978,532

(22) PCT Filed: Mar. 8, 2019

(86) PCT No.: PCT/JP2019/009409
§ 371 (c)(1),
(2) Date: Sep. 4, 2020

(87) PCT Pub. No.: WO2019/172434
PCT Pub. Date: Sep. 12, 2019

(65) Prior Publication Data
US 2020/0399404 A1 Dec. 24, 2020

(30) Foreign Application Priority Data
Mar. 8, 2018 (JP) ................................ 2018-041974

(51) Int. Cl.
| C08F 8/04 | (2006.01) |
| C08F 212/08 | (2006.01) |
| C08F 232/08 | (2006.01) |
| C09J 11/08 | (2006.01) |
| C09J 125/08 | (2006.01) |
| C09J 145/00 | (2006.01) |

(52) U.S. Cl.
CPC .............. *C08F 8/04* (2013.01); *C08F 212/08* (2013.01); *C08F 232/08* (2013.01); *C09J 11/08* (2013.01); *C09J 125/08* (2013.01); *C09J 145/00* (2013.01)

(58) Field of Classification Search
CPC ......... C08F 8/04; C08F 212/08; C08F 232/08
See application file for complete search history.

(56) References Cited

U.S. PATENT DOCUMENTS

| 7,957,947 | B2 * | 6/2011 | Odi | C08F 6/003 |
| | | | | 585/326 |
| 9,023,944 | B2 * | 5/2015 | Hayashi | C08F 8/04 |
| | | | | 524/554 |
| 9,644,043 | B2 * | 5/2017 | Miyamoto | C08F 6/10 |
| 9,994,650 | B2 * | 6/2018 | Iijima | C07C 2/42 |
| 11,220,563 | B2 * | 1/2022 | Matsushita | C08F 32/08 |
| 11,485,803 | B2 * | 11/2022 | Hayashi | C08F 6/10 |
| 2006/0223948 | A1 | 10/2006 | Yamane | |
| 2008/0052058 | A1 * | 2/2008 | Odi | C08F 6/003 |
| | | | | 703/12 |
| 2014/0148550 | A1 * | 5/2014 | Hayashi | C08F 8/04 |
| | | | | 525/51 |
| 2016/0308164 | A1 | 10/2016 | Mihara et al. | |
| 2016/0319047 | A1 * | 11/2016 | Miyamoto | C08F 6/10 |
| 2017/0096501 | A1 * | 4/2017 | Iijima | C07C 2/42 |
| 2020/0123360 | A1 | 4/2020 | Kanamaru et al. | |
| 2020/0385498 | A1 * | 12/2020 | Matsushita | C08F 212/08 |
| 2021/0024663 | A1 * | 1/2021 | Hayashi | C08F 8/04 |

FOREIGN PATENT DOCUMENTS

| CN | 105849136 A | 8/2016 |
| CN | 106674404 A | 5/2017 |
| JP | 55-4789 B1 | 1/1980 |
| JP | 2005-8750 A | 1/2005 |
| JP | 2007-204519 A | 8/2007 |
| JP | 2011-195711 A | 10/2011 |
| JP | 2015-196758 A | 11/2015 |
| JP | 2017-31273 A | 2/2017 |
| JP | 2017-190428 A | 10/2017 |
| WO | WO 2004/056882 A1 | 7/2004 |
| WO | WO 2015/098370 A1 | 7/2015 |
| WO | WO 2015/098692 A1 | 7/2015 |
| WO | WO 2018/193894 A1 | 10/2018 |

OTHER PUBLICATIONS

International Search Report issued on Jun. 4, 2019 in PCT/JP2019/009409 filed on Mar. 8, 2019, 2 pages.
Singaporean Office Action issued Sep. 14, 2022, in Singaporean Patent Application No. 11202008632W, 8 pages.
Japanese Office Action issued Sep. 13, 2022 in Japanese Patent Application No. 2020-504062 (with unedited computer generated English Translation), 9 pages.
Taiwanese Office Action issued on May 3, 2023 in Taiwanese Patent Application No. 108107932 (with English translation), 14 pages.
Extended European Search Report issued Dec. 13, 2021 in European Patent Application No. 19763905.7, 6 pages.
Combined Chinese Office Action and Search Report issued Jan. 4, 2022 in Chinese Patent Application No. 201980017293.5 (with English translation of Categories of Cited Documents), 8 pages.
Office Action issued Feb. 28, 2023, in corresponding Japanese Patent Application No. 2020-504062 (with English Translation), 12 pages.
Taiwanese Office Action issued Oct. 25, 2022 in Taiwanese Patent Application No. 108107932, 6 pages.

(Continued)

*Primary Examiner* — Margaret G Moore
(74) *Attorney, Agent, or Firm* — Oblon, McClelland, Maier & Neustadt, L.L.P.

(57) ABSTRACT

The present invention relates to a petroleum resin having the content of a volatile organic compound component of less than 100 wt ppm; and a hydrogenated petroleum resin having the content of a volatile organic compound component of less than 100 wt ppm.

5 Claims, No Drawings

(56) References Cited

OTHER PUBLICATIONS

Chinese Office Action issued Aug. 3, 2022 in Chinese Patent Application No. 201980017293.5, 5 pages.
Singaporean Office Action issued Jan. 4, 2024 in Singaporean Patent Application No. 11202008632W, 7 pages.

* cited by examiner

PETROLEUM RESIN, HYDROGENATED PETROLEUM RESIN, AND PRODUCTION METHOD FOR HYDROGENATED PETROLEUM RESIN

TECHNICAL FIELD

The present invention relates to a petroleum resin and a hydrogenated petroleum resin, each of which is less in the content of a volatile organic compound component and excellent in low odor properties, and a method for producing a hydrogenated petroleum resin.

BACKGROUND ART

In recent years, hot melt adhesives in which a thermoplastic compound server as a base polymer, and an additive, such as a tackifier, is blended are used in a variety of fields, such as production of sanitary goods, bookbinding, and various wrappings.

Examples of the thermoplastic compound serving as a base polymer of the hot melt adhesive include a natural rubber, an ethylene-vinyl acetate copolymer (EVA), an amorphous poly-α-olefin, a styrene-butadiene-styrene block copolymer (SBS), a styrene-isoprene-styrene block copolymer (SIS), and a material obtained through hydrogenation of such a rubber component, e.g., a styrene-ethylene-butylene-styrene rubber (SEBS) and a styrene-ethylene-propylene-styrene rubber (SEPS).

In addition, as the tackifier serving as the additive of the hot melt adhesive, for example, a rosin-based resin, a terpene-based resin, a petroleum resin, and a hydrogenated product thereof are used. Of these, from the viewpoint of adaptability to industrial production and high stability in quality, a petroleum resin is suitably used.

So far, a hot melt adhesive containing a petroleum resin as the tackifier has been used. In particular, in the case where the hot melt adhesive is used for production of sanitary goods, such as a disposable diaper, there is a concern that odors derived from volatile organic compounds (VOC) which are contained in the product give a feeling of displeasure to the user, or adversely affect the health, and various studies are made.

For example, PTL 1 discloses a method for producing a petroleum resin including a first step of polymerizing a hydrocarbon monomer by using a metal halide compound as a catalyst, to obtain a post-polymerization mixture containing a petroleum resin resulting from polymerization of the hydrocarbon monomer, a volatile component containing at least one of a polymerization solvent and an unreacted monomer, and a catalyst residue; a second step of adding water to the post-polymerization mixture obtained in the first step, to precipitate the catalyst residue and then remove it, thereby obtaining a catalyst residue-removed mixture; a third step of bringing an adsorbent into contact with the catalyst residue-removed mixture obtained in the second step, to obtain an adsorbent-treated mixture; and a fourth step of heating the adsorbent-treated mixture obtained in the third step, to volatilize the volatile component from the adsorbent-treated mixture and then recovering the petroleum resin from the remaining components.

In addition, PTL 2 discloses a petroleum resin, wherein a component having a weight average molecular weight of 300 or less is 0.5% by weight or less, a hue measured by a Gardner color difference meter is 8 or less, and a volatile organic compound component is 500 nL/g or less.

CITATION LIST

Patent Literature

PTL 1: JP 2015-196758 A
PTL 2: JP 2007-204519 A

SUMMARY OF INVENTION

Technical Problem

In PTL 1, water is added to the post-polymerization mixture to precipitate the catalyst residue, followed by removing it, thereby obtaining the catalyst residue-removed mixture. Then, it is disclosed that when the adsorbent mixture obtained by bringing the absorbent into contact with this catalyst residue-removed mixture is heated to volatilize the volatile component, the low-odor petroleum resin is obtained even without performing hydrogenation.

In addition, in PTL 2, it is disclosed that the volatile organic compound component is 500 nL/g or less.

However, even in the petroleum resins disclosed in PTL 1 and PTL 2, there is room for improvement on a petroleum resin which is excellent in low odor properties to levels at which it is applicable to sanitary goods, such as a disposable diaper.

Now, in order to solve the aforementioned problem, the present invention has been made, and an object thereof is to provide a petroleum resin and a hydrogenated petroleum resin, each of which is less in the content of a volatile organic compound component and excellent in low odor properties, and a method for producing a hydrogenated petroleum resin.

Solution to Problem

In view of the aforementioned problem, the present inventors made extensive and intensive investigations. As a result, it has been found that by controlling the content of the volatile organic compound component to less than a specified amount, a petroleum resin which is excellent in low odor properties is obtained, thereby leading to accomplishment of the present invention.

Specifically, the present invention is as follows.

[1] A petroleum resin having the content of a volatile organic compound component of less than 100 wt ppm.
[2] The petroleum resin as set forth in the above [1], wherein the petroleum resin contains a copolymer of a cyclopentadiene-based compound and a vinyl aromatic compound.
[3] The petroleum resin as set forth in the above [2], wherein the copolymer is one resulting from thermal polymerization of the cyclopentadiene-based compound and the vinyl aromatic compound.
[4] A hydrogenated petroleum resin having the content of a volatile organic compound component of less than 100 wt ppm.
[5] The hydrogenated petroleum resin as set forth in the above [4], wherein the content of the volatile organic compound component is less than 10 wt ppm.
[6] The hydrogenated petroleum resin as set forth in the above [4] or [5], wherein the petroleum resin as set forth in any one of the above [1] to [3] is one resulting from hydrogenation.

[7] The hydrogenated petroleum resin as set forth in the above [6], wherein the petroleum resin is one resulting from thermal polymerization of at least one selected from the group consisting of cyclopentadiene and dicyclopentadiene, and styrene.

[8] A hot melt adhesive composition containing at least one selected from the group consisting of the petroleum resin as set forth in any one of the above [1] to [3] and the hydrogenated petroleum resin as set forth in any one of the above [4] to [7].

[9] The hot melt adhesive composition as set forth in the above [8], further containing a thermoplastic compound.

[10] The hot melt adhesive composition as set forth in the above [9], wherein the thermoplastic compound is at least one selected from the group consisting of a styrene polymer, an ethylene-vinyl acetate copolymer (EVA), a styrene-butadiene-styrene block copolymer (SBS), a styrene-isoprene-styrene block copolymer (SIS), a natural rubber, an amorphous poly-α-olefin (APAO), a styrene-ethylene-butylene-styrene rubber (SEBS), and a styrene-ethylene-propylene-styrene rubber (SEPS).

[11] A method for producing a hydrogenated petroleum resin including a copolymerization reaction step of subjecting a cyclopentadiene-based compound and a vinyl aromatic compound to a copolymerization reaction in the presence of a polymerization solvent; a step of performing a removal treatment of a volatile component which is contained in a copolymerization reaction product liquid obtained in the copolymerization reaction step, to obtain a petroleum resin; a hydrogenation reaction step of subjecting the petroleum resin to a hydrogenation reaction in the presence of a hydrogenation solvent; a step of performing a removal treatment of an unreacted component and a volatile component which are contained in a hydrogenation reaction product liquid obtained in the hydrogenation reaction step, to obtain a hydrogenated petroleum resin concentrate; and a removal step of a volatile organic compound component by removing a volatile organic compound component from the hydrogenated petroleum resin concentrate, to obtain a hydrogenated petroleum resin containing 6 to 10% by mass of a hydrogenated low-molecular weight material, wherein the removal step of a volatile organic compound component is constituted of a first step of supplying the hydrogenated petroleum resin into a thin film distillation apparatus, to control the content of the volatile organic compound component to less than 2,000 wt ppm; and a second step of supplying the hydrogenated petroleum resin having passed the first step into a nitrogen-stripping apparatus or a steam distillation apparatus, to control the content of the volatile organic compound component to less than 100 wt ppm.

[12] The method for producing a hydrogenated petroleum resin as set forth in the above [11], wherein the content of the hydrogenated low-molecular weight material which is contained in the hydrogenated petroleum resin in the hydrogenated petroleum resin concentrate is 7 to 13% by mass in 100% by mass of the hydrogenated petroleum resin containing the hydrogenated low molecular material.

[13] The method for producing a hydrogenated petroleum resin as set forth in the above [11] or [12], wherein in the thin film distillation apparatus, a treatment temperature is 100 to 300° C., a treatment pressure is 0.1 to 15 kPa, and a treatment time is 5 to 180 minutes.

[14] The method for producing a hydrogenated petroleum resin as set forth in any one of the above [11] to [13], wherein in the nitrogen-stripping apparatus or the steam distillation apparatus, a treatment temperature is 150 to 300° C., a treatment pressure is 0.5 to 150 kPa, a nitrogen or steam flow rate is 100 to 1,000,000 mL/min relative to 100% by mass of the hydrogenated petroleum resin, and a treatment time is 10 to 180 minutes.

[15] The method for producing a hydrogenated petroleum resin as set forth in any one of the above [11] to [14], wherein a molecular weight of the hydrogenated low-molecular weight material which is contained in the hydrogenated petroleum resin is 200 to 350.

[16] The method for producing a hydrogenated petroleum resin as set forth in any one of the above [11] to [15], wherein the nitrogen-stripping apparatus is a rotary evaporator or a flash drum, and the steam distillation apparatus is a flash drum or a stripping tower.

Advantageous Effects of Invention

In accordance with the present invention, it is possible to provide a petroleum resin and a hydrogenated petroleum resin, each of which is less in the content of a volatile organic compound component and excellent in low odor properties, and a method for producing a hydrogenated petroleum resin.

DESCRIPTION OF EMBODIMENTS (Petroleum Resin)

In the present invention, the content of the volatile organic compound component (VOC component) which is contained in the petroleum resin is less than 100 wt ppm.

In the case where the content of the aforementioned VOC component is more than the aforementioned range, the content of the VOC component is excessively large, so that there is a concern that the low odor properties are inferior. In contrast, in the case where the content of the VOC component satisfies the aforementioned range, the content of the VOC component is small, and the low odor properties are excellent.

In this specification, the volatile organic compound component which is contained in the petroleum resin can be measured with a gas chromatograph in conformity with the quantitative determination method of the "(1-1) Quantitative Determination of Ethylcyclohexane as the Volatile Organic Compound Component" expressed in the test method in the section of Examples as mentioned later.

<Copolymerization Reaction Step>

Although the method for obtaining the petroleum resin prescribed in the present invention is not particularly limited, for example, it is preferred to adopt a polymerization reaction tank equipped with a heating apparatus, a pressurizing apparatus, and an agitating apparatus and use a cyclopentadiene-based compound as a first raw material and a vinyl aromatic compound as a second raw material. Then, it is preferred to subject the cyclopentadiene-based compound and the vinyl aromatic compound to a copolymerization reaction in the presence of a polymerization solvent under a predetermined condition, to produce a copolymer (petroleum resin).

Here, the copolymer (petroleum resin) is preferably one resulting from thermal polymerization of the cyclopentadiene-based compound and the vinyl aromatic compound.

More specifically, the copolymer (petroleum resin) is one resulting from thermal polymerization of at least one selected from the group consisting of cyclopentadiene and dicyclopentadiene, and styrene.

For the polymerization reaction tank, one connected with a first raw material tank, a second raw material tank, and a polymerization solvent tank can be used. The first raw material and the second raw material are stored in the first raw material tank and the second raw material tank, respectively, and a polymerization solvent is stored in the polymerization solvent tank.

The polymerization reaction tank can be designed in such a manner that the polymerization solvent is first supplied from the polymerization solvent tank, and subsequently, the first raw material and the second raw material are appropriately supplied from the first raw material tank and the second raw material tank, respectively. In addition, an opening and closing port is provided in the bottom of the polymerization reaction tank, thereby enabling the copolymer (petroleum resin) produced in the copolymerization reaction to outflow to the outside.

In the case where the first raw material and the second raw material are previously prepared as a mixture, the numbers of raw material tanks may be one.

Here, examples of the cyclopentadiene-based compound include cyclopentadiene, methylcyclopentadiene, ethylcyclopentadiene, and a dimer or codimer thereof. In addition, examples of the vinyl aromatic compound include styrene, α-methylstyrene, ß-methylstyrene, vinyltoluene, vinylxylene, indene, methylindene, and ethylindene.

Although the cyclopentadiene-based compound and the vinyl aromatic compound may be each supplied alone into the polymerization reaction tank, they may be previously mixed with each other to prepare a monomer mixture, which is then supplied into the polymerization reaction tank.

Although a mixing proportion of the cyclopentadiene-based compound and the vinyl aromatic compound is not particularly limited, a {(cyclopentadiene-based compound)/(vinyl aromatic compound)} ratio is preferably 70/30 to 20/80, and more preferably 60/40 to 40/60 in terms of a mass ratio.

Representative examples of the polymerization solvent which is used for the copolymerization reaction of the cyclopentadiene-based compound and the vinyl aromatic compound include aromatic solvents, naphthenic solvents, and aliphatic hydrocarbon-based solvents. As a specific example of the polymerization solvent, toluene, xylene, cyclohexane, methylcyclohexane, dimethylcyclohexane, ethylcyclohexane, and so on are suitably used.

The use amount of the polymerization solvent is preferably 50 to 500% by mass, and more preferably 60 to 300% by mass relative to 100% by mass of the monomer mixture.

From the viewpoint of smoothly commencing the thermal polymerization, it is preferred that the polymerization solvent supplied into the polymerization reaction tank is previously heated to a temperature of preferably 100° C. or higher, and more preferably 150° C. or higher. It is preferred that the monomer mixture of the cyclopentadiene-based compound and the vinyl aromatic compound is added in the thus previously heated polymerization solvent, to undergo the copolymerization reaction under a predetermined condition while stirring.

Here, from the viewpoint of controlling heat generation to be caused due to the polymerization, the addition of the monomer mixture is preferably divided addition or continuous addition. The addition amount of the divided monomer mixture is preferably an equal amount.

In the addition of the monomer mixture, the time required from commencement until completion of the addition is preferably 0.5 to 5 hours, and more preferably 1 to 3 hours.

It is preferred that even after completion of the addition of the monomer mixture, the copolymerization reaction is continued.

Although the predetermined condition in the copolymerization reaction is not particularly limited, a reaction temperature is typically 150 to 350° C., and preferably 220 to 300° C.; a reaction pressure is typically 0 to 2 MPaG, and preferably 0 to 1.5 MPaG; and a reaction time is typically 1 to 10 hours, and preferably 1 to 8 hours.

From the viewpoint of obtaining the desired petroleum resin, it is preferred to perform a recovery and removal treatment of a "volatile component" under a predetermined condition taking the thus obtained hydrogenation reaction product liquid as an object.

The "volatile component" as referred to herein is corresponding to the polymerization solvent, the unreacted monomer, the low-molecular weight copolymer having a molecular weight of about 200 to 350, and so on.

From the viewpoint of economy, it is preferred that the solvent recovered after passing the recovery and removal treatment of the "volatile component" is reused as the polymerization solvent.

Although the predetermined condition in the recovery and removal treatment of the "volatile component" is not particularly limited, a treatment temperature is typically 100 to 300° C.; a treatment pressure is typically atmospheric pressure; and a treatment time is typically 1 to 3 hours.

In the solvent recovered after passing the recovery and removal treatment of the "volatile component", the low-molecular weight copolymer having a molecular weight of about 200 to 350 is typically contained. The content of the low-molecular weight copolymer which is contained in the recovered solvent is controlled to preferably 4% by mass or less, and more preferably 3.5% by mass or less in the recovered solvent from the viewpoint of not lowering a tackiness-imparting performance which the copolymer (petroleum resin) to be produced has.

In the case where the content of the low-molecular weight copolymer satisfies the aforementioned range, the recovered solvent can be reused as it is and then supplied as the polymerization solvent into the polymerization reaction tank.

On the other hand, in the case where the content of the low-molecular weight copolymer is more than the aforementioned range, it is preferred to perform separation and removal of the low-molecular weight copolymer in the recovered solvent separately, or dilution with a new polymerization solvent, or other means, to regulate the content of the low-molecular weight copolymer so as to satisfy the aforementioned range for reused, and to supply the resultant as the polymerization solvent into the polymerization reaction tank.

As mentioned above, it is preferred that the solvent recovered after passing the recovery and removal treatment of the "volatile component" is reused as the polymerization solvent, and the copolymerization reaction between the cyclopentadiene-based compound and the vinyl aromatic compound is performed. Then, the petroleum resin that is a copolymer of the cyclopentadiene-based compound and the vinyl aromatic compound can be obtained as the copolymerization reaction product.

As for physical properties of the thus obtained petroleum resin, it is preferred that a softening point is 50 to 120° C.; a vinyl aromatic compound unit content is 30 to 90% by mass; a bromine number is 30 to 90 g/100 g; and a number average molecular weight is 400 to 1,100.

(Hydrogenated Petroleum Resin)

In the present invention, the content of the volatile organic compound component (VOC component) which is contained in the hydrogenated petroleum resin is less than 100 wt ppm, and preferably less than 10 wt ppm.

In the case where the content of the VOC component is more than the aforementioned range, the content of the VOC component is excessively large, so that there is a concern that the low odor properties are inferior. In contrast, in the case where the content of the VOC component satisfies the aforementioned range, the content of the VOC component is small, and the low odor properties are excellent.

In this specification, the volatile organic compound component which is contained in the hydrogenated petroleum resin can be measured with a gas chromatograph in conformity with the "(1-1) Quantitative Determination of Ethylcyclohexane as the Volatile Organic Compound Component" expressed in the test method in the section of Examples as mentioned later.

<Hydrogenation Reaction Step>

Although the method for obtaining the hydrogenated petroleum resin prescribed in the present invention is not particularly limited, for example, it is preferred that a hydrogenation reaction tank equipped with a heating apparatus and a pressurizing apparatus is adopted, the copolymer (petroleum resin) obtained in the aforementioned copolymerization reaction is dissolved in a hydrogenation solvent, and hydrogen is added optionally in the presence of a hydrogenation reaction catalyst under a predetermined condition, to undergo the hydrogenation reaction, thereby producing the hydrogenated petroleum resin.

In this way, the hydrogenated petroleum resin prescribed in the present invention is preferably one resulting from hydrogenation (hydrogen addition) of the copolymer (petroleum resin) obtained in the aforementioned copolymerization reaction.

In the case where an aromatic ring is contained in the constituent component of the petroleum resin, the hydrogenated petroleum resin is preferably one in which the aromatic ring is also subjected to hydrogenation (hydrogen addition).

The hydrogenated petroleum resin may be a partial hydrogenation type in which the petroleum resin is partially hydrogenated, or may be a complete hydrogenation type in which the petroleum resin is completely hydrogenated.

Here, examples of the hydrogenation solvent include cyclohexane, methylcyclohexane, dimethylcyclohexane, ethylcyclohexane, and tetrahydrofuran.

Although a method in which the copolymer (petroleum resin) obtained in the aforementioned copolymerization reaction is dissolved in the hydrogenation solvent and then supplied into the hydrogenation reaction tank is not particularly limited, for example, the copolymer (petroleum resin) and the hydrogenation solvent may be each supplied alone into the polymerization reaction tank and dissolved, or they may be previously mixed with each other to prepare a dissolved mixture, which is then supplied into the polymerization reaction tank.

Although a mixing proportion of the petroleum resin used and the hydrogenation solvent used is not particularly limited, a {(petroleum resin)/(hydrogenation solvent)} ratio is preferably 10/90 to 50/50, and more preferably 20/80 to 40/60 in terms of a mass ratio.

Examples of the hydrogenation reaction catalyst which is used for the hydrogenation reaction include nickel, palladium, cobalt, platinum, and rhodium.

Although the predetermined condition in the hydrogenation reaction is not particularly limited, a supply pressure of hydrogen is typically 1.0 to 6.0 MPaG; a reaction temperature is typically 120 to 300° C., and preferably 150 to 250° C.; and a reaction time is typically 1 to 7 hours, and preferably 2 to 5 hours.

With respect to the hydrogenated petroleum resin thus obtained through the hydrogenation reaction, a viscosity to be measured at a treatment temperature in the removal step of the volatile organic compound component, which is the subsequent step, in conformity with JIS Z8803 is preferably 0.01 to 1.0 Pa·s.

When the viscosity of the hydrogenated petroleum resin which is obtained in the aforementioned hydrogenation reaction falls within the aforementioned range, the volatile organic compound component (VOC component) can be efficiently removed in the removal step of the volatile organic compound component, which is the subsequent step.

<Step of Obtaining Hydrogenated Petroleum Resin Concentrate>

On the other hand, with respect to the hydrogenation reaction product liquid thus obtained through the hydrogenation reaction, from the viewpoint of obtaining the desired hydrogenated petroleum resin, it is preferred to perform each of the removal treatment of the "unreacted component" and the recovery and removal treatment of the "volatile component" under a predetermined condition.

The "unreacted component" as referred to herein is corresponding to the unreacted hydrogen or the like. In addition, the "volatile component" as referred to herein is corresponding to the hydrogenation solvent or the like.

From the viewpoint of economy, it is preferred that the solvent recovered after passing the recovery and removal treatment of the "volatile component" is reused as the hydrogenation solvent.

Although the predetermined condition in the removal treatment of the "unreacted component" is not particularly limited, a treatment temperature is typically 100 to 200° C.; a treatment pressure is typically 1 to 5 MPaG; and a treatment time is typically 1 to 3 hours.

Although the predetermined condition in the recovery and removal treatment of the "volatile component" is not particularly limited, a treatment temperature is typically 100 to 300° C.; a treatment pressure is typically 0 to 10 kPaG; and a treatment time is typically 1 to 3 hours.

Although the respective methods of performing the removal treatment of the "unreacted component" and the recovery and removal treatment of the "volatile component" taking the hydrogenation reaction product liquid obtained through the hydrogenation reaction as an object are not particularly limited, for example, by using a first separator and a second separator and making the predetermined conditions in the respective separators during the process of passing the hydrogenation reaction product liquid from the hydrogenation reaction tank through the respective separators different from each other, the removal treatment of the "unreacted component" and the "volatile component", which are different in physical properties, such as a boiling point, from each other, can be efficiently performed.

In order to allow the hydrogenation reaction product liquid from the hydrogenation reaction tank to pass through the respective separators, specifically, it is preferred to adopt a configuration in which the first separator is connected with the hydrogenation reaction tank, and the second separator is connected with the first separator.

By adopting such a configuration, the liquid passing of the hydrogenation reaction product liquid is continuously performed from the hydrogenation reaction tank to the first separator and then the second separator, so that the removal treatment of the "unreacted component" and the recovery and removal treatment of the "volatile component" can be efficiently performed.

Although the predetermined condition under which the removal treatment of the "unreacted component" with the first separator is performed is not particularly limited, a treatment temperature is typically 100 to 200° C.; a treatment pressure is typically 1 to 5 MPaG; and a treatment time is typically 1 to 3 hours.

Although the predetermined condition under which the recovery and removal treatment of the "volatile component" with the second separator is performed is not particularly limited, a treatment temperature is typically 100 to 300° C.; a treatment pressure is typically 0 to 10 kPaG; and a treatment time is typically 1 to 3 hours.

As mentioned above, it is preferred that the solvent recovered after passing the removal treatment of the "unreacted component" and the recovery and removal treatment of the "volatile component" is reused as the polymerization solvent, and hydrogen is added to undergo the hydrogenation reaction relative to the petroleum resin. Then, the hydrogenated petroleum resin as the hydrogenation reaction product can be obtained. The content of the hydrogenated low-molecular weight material which is contained in the hydrogenated petroleum resin in the hydrogenated petroleum resin concentrate at the stage after passing the removal treatment of the "unreacted component" and the recovery and removal treatment of the "volatile component" in this way is preferably 7 to 13% by mass in 100% by mass of the hydrogenated petroleum resin containing the hydrogenated low-molecular weight material from the viewpoint of not lowering the tackiness-imparting performance which the hydrogenated petroleum resin to be produced has and the viewpoint of finally obtaining the hydrogenated petroleum resin which is excellent in low odor properties.

In this specification, the hydrogenated low-molecular weight material which is contained in the hydrogenated petroleum resin in the hydrogenated petroleum resin concentrate can be measured by the "(1-2) Quantitative Determination of Hydrogenated Low-Molecular Weight Material" expressed in the test method in the section of Examples as mentioned later.

Here, in general, the molecular weight of the hydrogenated low-molecular weight material is preferably 200 to 350.

In this specification, the molecular weight of the hydrogenated low-molecular weight material can be measured by means of GC-MS.

<Removal Step of Volatile Organic Compound Component>

In the present invention, though a method for reducing the content of the volatile organic compound component which is contained in the hydrogenated petroleum resin is not particularly limited, for example, distillation methods, such as (1) thin film distillation, (2) nitrogen stripping, and (3) steam distillation, can be adopted.

From the viewpoint of enhancing the effect for reducing the content of the volatile organic compound component, it is preferred to perform the distillation method which is adopted in the present invention in the order such that the thin film distillation (1) is first performed as a first step, and the nitrogen stripping (2) or the steam distillation (3) is subsequently performed as a second step.

When passing the first step and the second step in this way, the volatile organic compound component can be removed while leaving the hydrogenated low-molecular weight material in an amount of 6 to 10% by mass in the hydrogenated petroleum resin.

(1) Thin Film Distillation

An apparatus which is used for the thin film distillation is not particularly limited so long as it is a generally adopted apparatus, and for example, a centrifugal thin film evaporator ("Horizontal Kontro", manufactured by Hitachi Plant Technologies, Ltd.) can be used.

Specifically, by supplying the hydrogenated petroleum resin obtained through the aforementioned hydrogenation reaction, preferably the hydrogenated petroleum resin obtained by performing the removal treatment of the "unreacted component" and the recovery and removal treatment of the "volatile component", into the thin film distillation apparatus, the volatile organic compound component can be removed while undergoing the thin film evaporation optionally in the presence of an antioxidant under a predetermined condition.

Although the predetermined condition in the thin film distillation is not particularly limited, a treatment temperature is typically 100 to 300° C.; a treatment pressure is typically 0.1 to 15 kPa; and a treatment time is typically 5 to 180 minutes.

Although a timing at which the antioxidant is added is not particularly limited, in the case where after performing the thin film distillation, the steam distillation is not performed, it is preferred to add the antioxidant at the stage before performing the thin film distillation.

On the other hand, in the case where after performing the thin film distillation, the steam distillation is performed, from the viewpoint of preventing occurrence of hydrolysis of the antioxidant with steam, it is preferred to add the antioxidant at the stage after performing the steam distillation.

Here, examples of the antioxidant include a phenol-based antioxidant and a phosphite-based antioxidant.

In the case of using the antioxidant, its use amount is preferably 0.1 to 2.0% by mass, and more preferably 0.3 to 1.0% by mass relative to 100% by mass of the hydrogenated petroleum resin.

The content of the volatile organic compound component which is contained in the hydrogenated petroleum resin at the stage after passing such thin film distillation is preferably less than 2,000 wt ppm, and more preferably less than 1,500 wt ppm from the viewpoint of finally obtaining the hydrogenated petroleum resin which is excellent in low odor properties.

(2) Nitrogen Stripping

An apparatus which is used for the nitrogen stripping is not particularly limited so long as it is a generally adopted apparatus, and examples thereof include a rotary evaporator and a flash drum.

Specifically, the hydrogenated petroleum resin obtained after passing the thin film distillation (1) as the first step is mixed with nitrogen by using an MSE Static Mixer, manufactured by ISEL Co., Ltd. and then separated from the nitrogen by the flash drum.

Although a predetermined condition in the nitrogen stripping is not particularly limited, a treatment temperature is typically 150 to 300° C.; a treatment pressure is typically 0.5 to 100 kPa; a nitrogen flow rate is typically 100 to 1,000,000 mL/min relative to 100% by mass of the hydrogenated petroleum resin; and a treatment time is typically 10 to 180 minutes.

The content of the volatile organic compound component which is contained in the hydrogenated petroleum resin obtained after passing such nitrogen stripping is preferably less than 100 wt ppm, and more preferably less than 10 wt ppm from the viewpoint of finally obtaining the hydrogenated petroleum resin which is excellent in low odor properties.

(3) Steam Distillation

An apparatus which is used for the steam distillation is not particularly limited so long as it is a generally adopted apparatus, for example, a flash drum, a wetted-wall tower, a stripping tower, and so on can be adopted.

Specifically, the hydrogenated petroleum resin obtained after passing the thin film distillation (1) as the first step is mixed with steam by using an MSE Static Mixer, manufactured by ISEL Co., Ltd. and then separated from the steam by the flash drum.

As for a predetermined condition in the steam distillation, similar to the case in the nitrogen stripping, a treatment temperature is typically 150 to 300° C.; a treatment pressure is typically 0.5 to 150 kPa; a steam flow rate is typically 100 to 1,000,000 mL/min relative to 100% by mass of the hydrogenated petroleum resin; and a treatment time is typically 10 to 180 minutes.

A condition for the supply amount and the treatment pressure of steam relative to the hydrogenated petroleum resin according to the reduction target of the volatile organic compound component is hereunder exemplified.

<Reduction Target: Less than 100 wt Ppm>

In the case where the reduction target on the occasion when the volatile organic compound component is derived from a mixed solvent of ethylcyclohexane and dimethylcyclohexane (mixing proportion=8/2 (mass ratio)) is controlled to less than 100 wt ppm, for example, the steam is supplied in an amount of 0.3% by mass relative to 100% by mass of the hydrogenated petroleum resin and flashed at a pressure of 11 kPaA.

According to this, the ethylcyclohexane and the dimethylcyclohexane, each being the volatile organic compound component, which are contained in the hydrogenated petroleum resin, can be reduced to 79 wt ppm and 20 wt ppm, respectively.

<Reduction Target: Less than 10 wt Ppm>

In the case where the reduction target on the occasion when the volatile organic compound component is derived from a mixed solvent of ethylcyclohexane and dimethylcyclohexane (mixing proportion=8/2 (mass ratio)) is controlled to less than 10 wt ppm, for example, the steam is supplied in an amount of 0.5% by mass relative to 100% by mass of the hydrogenated petroleum resin and flashed at a pressure of 10 kPaA, and the steam is again supplied in an amount of 0.3% by mass relative to 100% by mass of the hydrogenated petroleum resin and flashed at a pressure of 10 kPaA.

According to this, the ethylcyclohexane and the dimethylcyclohexane, each being the volatile organic compound component, which are contained in the hydrogenated petroleum resin, can be reduced to 5 wt ppm and 1 wt ppm, respectively.

<Reduction Target: Less than 1 wt Ppm>

In the case where the reduction target on the occasion when the volatile organic compound component is derived from a mixed solvent of ethylcyclohexane and dimethylcyclohexane (mixing proportion=8/2 (mass ratio)) is controlled to less than 1 wt ppm, for example, the steam is supplied in an amount of 0.5% by mass relative to 100% by mass of the hydrogenated petroleum resin and flashed at a pressure of 10 kPaA, and the steam is again supplied in an amount of 0.5% by mass relative to 100% by mass of the hydrogenated petroleum resin and flashed at a pressure of 10 kPaA.

According to this, the ethylcyclohexane and the dimethylcyclohexane, each being the volatile organic compound component, which are contained in the hydrogenated petroleum resin, can be reduced to 0.3 wt ppm and 0.0 wt ppm, respectively.

The content of the volatile organic compound component which is contained in the hydrogenated petroleum resin obtained after passing such steam distillation is preferably less than 100 wt ppm, and more preferably less than 10 wt ppm from the viewpoint of finally obtaining the hydrogenated petroleum resin which is excellent in low odor properties.

In the light of the above, in the removal step of the volatile organic compound component, while the method for reducing the content of the volatile organic compound component which is contained in the hydrogenated petroleum resin has been mentioned, with respect to the petroleum resin, the content of the volatile organic compound component can be reduced by applying the same method as for the hydrogenated petroleum resin.

Here, in the removal step of the volatile organic compound component constituted of the first step of performing the thin film distillation and the second step of performing the nitrogen stripping or steam distillation, it is preferred to perform the removal step in such a manner that the hydrogenated low-molecular weight material having a molecular weight of about 200 to 350 is contained in an amount of 6 to 10% by mass in 100% by mass of the hydrogenated petroleum resin containing the hydrogenated low-molecular weight material in the hydrogenated petroleum resin obtained after passing the removal step.

The content of the hydrogenated low-molecular weight material having a molecular weight of about 200 to 350, which is contained in the hydrogenated petroleum resin is controlled to preferably 6 to 10% by mass, and more preferably 7 to 8% by mass in 100% by mass of the hydrogenated petroleum resin containing the hydrogenated low-molecular weight material from the viewpoint of not lowering the tackiness-imparting performance which the hydrogenated petroleum resin to be produced has.

In this specification, the hydrogenated low-molecular weight material which is contained in the hydrogenated petroleum resin can be measured by the "(1-2) Quantitative Determination of Hydrogenated Low-Molecular Weight Material" expressed in the test method of the section of Examples as mentioned later.

As for physical properties of the thus obtained hydrogenated petroleum resin, it is preferred that a softening point is 90 to 160° C.; a vinyl aromatic compound unit content is 0 to 35% by mass; a bromine number is 0 to 30 g/100 g; and a number average molecular weight is 500 to 1,100.

(Hot Melt Adhesive Composition)

The hot melt adhesive composition in the present invention can be obtained by allowing at least one selected from the group consisting of the aforementioned petroleum resin and the aforementioned hydrogenated petroleum resin to serve as a tackifier resin and blending it with a thermoplastic compound serving as a base polymer, a plasticizer, and so on.

Examples of the thermoplastic compound serving as a base polymer include a styrene polymer, an ethylene-vinyl acetate copolymer (EVA), a styrene-butadiene-styrene block copolymer (SBS), a styrene-isoprene-styrene block copolymer (SIS), a natural rubber, and an amorphous poly-α-olefin (APAO); and a styrene-ethylene-butylene-styrene rubber (SEBS) and a styrene-ethylene-propylene-styrene rubber (SEPS), each of which is obtained through hydrogenation of such a rubber component.

Examples of the plasticizer include a paraffinic process oil which is obtainable by vacuum distilling a heavy oil fraction obtained through atmospheric distillation of a crude oil, and further refining it by hydrogenation reforming, dewaxing treatment, or the like; and a naphthenic process oil which is obtainable by after vacuum distillation, further performing solvent extraction, hydrogenation, and clay treatment. Besides, examples thereof include polybutene and a poly-α-olefin in a liquid form.

Although a production method of the hot melt adhesive composition is not particularly limited, a method of performing heat melting agitation or kneading by using a propeller-type agitator, a twin-screw kneading machine, a kneader, or the like can be adopted.

At the time of production of the hot melt adhesive composition, though a heating temperature is not particularly limited, in general, it is preferably 120 to 190° C.

At the time of production of the hot melt adhesive composition, though the blending order and the blending amounts of the respective components are not particularly limited, the blending amounts of the aforementioned three components vary with the physical properties required as the hot melt adhesive composition. For example, the hot melt adhesive composition is preferably one constituted in a range such that at least one selected from the group consisting of the petroleum resin and the hydrogenated petroleum resin according to the present invention is 30 to 70% by mass, the thermoplastic compound serving as a base polymer is 15 to 40% by mass, and the plasticizer is 10 to 40% by mass.

As for the blending components of the hot melt adhesive composition, in addition to at least one selected from the group constituting of the aforementioned petroleum resin and the aforementioned hydrogenated petroleum resin, the thermoplastic compound serving as a base polymer, and the plasticizer, an antioxidant, a wax, and a filler may be added in a range where physical properties thereof are not impaired.

The hot melt adhesive obtained in the present invention is excellent in low odor properties because the petroleum resin or the hydrogenated petroleum resin, in which the content of the volatile organic compound component is small, can be used as the raw material.

Accordingly, the hot melt adhesive obtained in the present invention can be utilized in various fields for sanitary goods, various wrappings, bookbinding, textile, woodworking, electrical materials, canning, building, bag making, road binders, and so on; however, in particular, it can be suitably used for sanitary goods, such as a disposable diaper.

EXAMPLES

The present invention is hereunder described more specifically by reference to the following Examples, but it should be construed that the present invention is not limited to these Examples.

Example 1

(Copolymerization Reaction Step)

90% by mass of xylene as a polymerization solvent was supplied into a nitrogen-purged polymerization reaction tank equipped with an agitator and heated to a temperature of 260° C.

In this polymerization reaction tank, 100% by mass of a monomer mixture of (di)cyclopentadiene and styrene (mixing proportion=1/1 (mass ratio)) was equally dividedly added over 3 hours and subjected to copolymerization reaction while agitating such that the polymerization reaction system was kept at a temperature of 260° C. Thereafter, the copolymer reaction was continuously performed for 115 minutes while keeping the temperature at 260° C.

The "(di)cyclopentadiene" as referred to herein refers to a mixture of cyclopentadiene and dicyclopentadiene.

(Step of Obtaining Petroleum Resin)

A recovery and removal treatment of a "volatile component" was performed under the following condition taking the copolymerization reaction product liquid obtained in the copolymerization reaction as an object.

<Recovery and Removal Treatment Condition of "Volatile Component">

Treatment temperature: 175° C.
Treatment pressure: Atmospheric pressure
Treatment time: 3 hours Here, the content of a low-molecular weight copolymer having a molecular weight of about 200 to 350, which was contained in the solvent recovered after passing the recovery and removal treatment of the "volatile component", was found to be 4% by mass or less.

For this reason, the recovered solvent was reused as the polymerization solvent, and a copolymerization reaction between a cyclopentadiene-based compound and a vinyl aromatic compound was performed.

There was thus obtained a petroleum resin as the copolymer of the cyclopentadiene-based compound and the vinyl aromatic compound as a copolymerization reaction product.

The "volatile component" as referred to herein is corresponding to the polymerization solvent, the unreacted monomer, the low-molecular weight copolymer having a molecular weight of about 200 to 350, and so on.

(Hydrogenation Reaction Step)

A dissolved mixture of the petroleum resin obtained in the aforementioned copolymerization reaction step and ethylcyclohexane as a hydrogenation solvent (mixing proportion=1/3 (mass ratio)) was supplied into a hydrogenation reaction tank, hydrogen was further supplied into the hydrogenation reaction tank at a supply pressure of hydrogen of 5.0 MPaG, and a hydrogenation reaction was performed at a reaction temperature of 150 to 250° C. for 12 hours.

The hydrogenation reaction tank is previously connected with a first separator, and a second separator is connected with the first separator.

In the first separator, the "unreacted component" is subjected to the removal treatment, and in the second separator, the "volatile component" is subjected to the recovery and removal treatment.

The "unreacted component" as referred to herein is corresponding to unreacted hydrogen and so on. In addition, the "volatile component" as referred to herein is corresponding to ethylcyclohexane as the hydrogenation solvent, and so on.

(Step of Obtaining Hydrogenated Petroleum Resin Concentrate)

The hydrogenated reaction product liquid obtained by the hydrogenation reaction was passed through the first separator under the following treatment condition (1) and subsequently passed through the second separator under the following treatment condition (2), to undergo the removal treatment of the "unreacted component" and the recovery and removal treatment of the "volatile component", thereby obtaining a hydrogenated petroleum resin concentrate.
(1) Removal Treatment Condition of "Unreacted Component" in First Separator
Treatment temperature: 150° C.
Treatment pressure: 4.4 MPaG
Treatment time: 1 hour
(2) Recovery and Removal Treatment Condition of "Volatile Component" in Second Separator
Treatment temperature: 230° C.
Treatment pressure: 4 kPaG
Treatment time: 1 hour Here, the hydrogenated low-molecular weight material which was contained in the hydrogenated petroleum resin in the hydrogenated petroleum resin concentrate was subjected to quantitative determination by a method (1-2) as mentioned below. As a result, the content of the hydrogenated low-molecular weight material was found to be 9.5% by mass in 100% by mass of the hydrogenated petroleum resin containing the hydrogenated low-molecular weight material.

The molecular weight of the hydrogenated low-molecular weight material was measured by means of GC-MS. As a result, peaks were detected in a molecular weight range of 200 to 350.

(Removal Step of Volatile Organic Compound Component)

<First Step: Thin Film Distillation>

A material obtained through addition of 7,000 wt ppm of an antioxidant (trade name: Irganox 1010) in the hydrogenated petroleum resin concentrate obtained in the aforementioned step was supplied into a centrifugal thin film evaporator ("Horizontal Kontro", manufactured by Hitachi Plant Technologies, Ltd.), and the volatile organic compound component was removed while undergoing thin film distillation under the following treatment condition, to obtain a hydrogenated petroleum resin at the stage after passing the first step (thin film distillation).
Treatment temperature: 210° C.
Treatment pressure: 4 kPa
Treatment time: 6 minutes The ethylcyclohexane as the volatile organic compound component, which was contained in the hydrogenated petroleum resin obtained after passing the foregoing first step (thin film distillation), was subjected to quantitative determination by a method (1-1) as mentioned below. As a result, the content of the ethylcyclohexane was found to be 1,300 wt ppm.

<Second Step: Nitrogen Stripping>

500 g of the hydrogenated petroleum resin having passed the aforementioned (thin film distillation) was supplied into a rotary evaporator, and the volatile organic compound component was removed under the following treatment condition while introducing nitrogen, to obtain a hydrogenated petroleum resin of Example 1 at the stage after passing the second step (nitrogen stripping).
Treatment temperature: 200° C.
Treatment pressure: 100 kPa
Nitrogen flow rate: 1,500 mL/min
Treatment time: 105 minutes The ethylcyclohexane as the volatile organic compound component, which was contained in the hydrogenated petroleum resin of Example 1 obtained after passing the foregoing second step (nitrogen stripping), was subjected to quantitative determination by a method (1-1) as mentioned below. As a result, the content of the ethylcyclohexane was found to be 2 wt ppm.

Here, the hydrogenated low-molecular weight material which was contained in the hydrogenated petroleum resin obtained in Example 1 was subjected to quantitative determination by a method (1-2) as mentioned below. As a result, the content of the hydrogenated low-molecular weight material was found to be 7.2% by mass in 100% by mass of the hydrogenated petroleum resin containing the hydrogenated low-molecular weight material.

Here, the molecular weight of the hydrogenated low-molecular weight material was measured by means of GC-MS. As a result, peaks were detected in a molecular weight range of 200 to 350.

Furthermore, the hydrogenated petroleum resin obtained in Example 1 was measured for the following physical properties. As a result, the following results were obtained.
Softening point: 106° C. (applied with the provisions of JIS K2207:2006)
Vinyl aromatic compound unit content: 20.3% by mass (quantitatively determined with infrared spectrophotometer (absorbance: 700 cm$^{-1}$))
Bromine number: 5.8 g/100 g (applied with the provisions of JIS K2605:1996)
Number average molecular weight (Mn): 720 (GPC measurement method; column: TSK Gel G200H$_{XL}$ & G4000H$_{XL}$, flow rate: 1 mL/min, eluant: THF, temperature: 40° C.)

Example 2

A hydrogenated petroleum resin of Example 2 was obtained in the same manner as in Example 1, except that in the second step (nitrogen stripping) of the removal step of the volatile organic compound component of Example 1, the treatment time of the rotary evaporator was changed from 105 minutes to 150 minutes.

The ethylcyclohexane as the volatile organic compound component, which was contained in the hydrogenated petroleum resin obtained in Example 2, was subjected to quantitative determination by a method (1-1) as mentioned below. As a result, the content of the ethylcyclohexane was found to be 0 wt ppm.

Here, the hydrogenated low-molecular weight material which was contained in the hydrogenated petroleum resin obtained in Example 2 was subjected to quantitative determination by a method (1-2) as mentioned below. As a result, the content of the hydrogenated low-molecular weight material was found to be 7.1% by mass in 100% by mass of the hydrogenated petroleum resin containing the hydrogenated low-molecular weight material.

Here, the molecular weight of the hydrogenated low-molecular weight material was measured by means of GC-MS. As a result, peaks were detected in a molecular weight range of 200 to 350.

Furthermore, the hydrogenated petroleum resin obtained in Example 2 was measured for the following physical properties. As a result, the following results were obtained.
Softening point: 106° C. (applied with the provisions of JIS K2207:2006)
Vinyl aromatic compound unit content: 20.3% by mass (quantitatively determined with infrared spectrophotometer (absorbance: 700 cm$^{-1}$))
Bromine number: 5.8 g/100 g (applied with the provisions of JIS K2605:1996)
Number average molecular weight (Mn): 720 (GPC measurement method; column: TSK Gel G200H$_{XL}$ & G4000H$_{XL}$, flow rate: 1 mL/min, eluant: THF, temperature: 40° C.)

Comparative Example 1

A hydrogenated petroleum resin of Comparative Example 1 was obtained in the same manner as in Example 1, except that in the removal step of the volatile organic compound component of Example 1, the second step (nitrogen stripping) was not performed.

The ethylcyclohexane as the volatile organic compound component, which was contained in the hydrogenated petroleum resin obtained in Comparative Example 1, was subjected to quantitative determination by a method (1-1) as mentioned below. As a result, the content of the ethylcyclohexane was found to be 1,300 wt ppm.

Here, the hydrogenated low-molecular weight material which was contained in the hydrogenated petroleum resin obtained in Comparative Example 1 was subjected to quantitative determination by a method (1-2) as mentioned below. As a result, the content of the hydrogenated low-molecular weight material was found to be 7.5% by mass in 100% by mass of the hydrogenated petroleum resin containing the hydrogenated low-molecular weight material.

Here, the molecular weight of the hydrogenated low-molecular weight material was measured by means of GC-MS. As a result, peaks were detected in a molecular weight range of 200 to 350.

Furthermore, the hydrogenated petroleum resin obtained in Comparative Example 1 was measured for the following physical properties. As a result, the following results were obtained.

Softening point: 101° C. (applied with the provisions of JIS K2207:2006) Vinyl aromatic compound unit content: 20.3% by mass (quantitatively determined with infrared spectrophotometer (absorbance: 700 cm$^{-1}$))

Bromine number: 5.8 g/100 g (applied with the provisions of JIS K2605:1996)

Number average molecular weight (Mn): 710 (GPC measurement method; column: TSK Gel G200H$_{XL}$ & G4000H$_{XL}$, flow rate: 1 mL/min, eluant: THF, temperature: 40° C.)

Comparative Example 2

A hydrogenated petroleum resin concentrate was obtained in the same manner as in Example 1, except that in the copolymerization reaction step of Example 1, the time of copolymerization reaction was changed from 115 minutes to 80 minutes.

Here, the hydrogenated low-molecular weight material which was contained in the hydrogenated petroleum resin in the hydrogenated petroleum resin concentrate was subjected to quantitative determination by a method (1-2) as mentioned below. As a result, the content of the hydrogenated low-molecular weight material was found to be 7.9% by mass in 100% by mass of the hydrogenated petroleum resin containing the hydrogenated low-molecular weight material.

Here, the molecular weight of the hydrogenated low-molecular weight material was measured by means of GC-MS. As a result, peaks were detected in a molecular weight range of 200 to 350.

A hydrogenated petroleum resin of Comparative Example 2 was obtained in the same manner as in Example 1, except that in the removal step of the volatile organic compound component of Example 1, the treatment temperature of the treatment condition of the first step (thin film distillation) was changed from 210° C. to 240° C., and the second step (nitrogen stripping) was not performed.

The ethylcyclohexane as the volatile organic compound component, which was contained in the hydrogenated petroleum resin obtained in Comparative Example 2, was subjected to quantitative determination by a method (1-1) as mentioned below. As a result, the content of the ethylcyclohexane was found to be 600 wt ppm.

Here, the hydrogenated low-molecular weight material which was contained in the hydrogenated petroleum resin obtained in Comparative Example 2 was subjected to quantitative determination by a method (1-2) as mentioned below. As a result, the content of the hydrogenated low-molecular weight material was found to be 6.5% by mass in 100% by mass of the hydrogenated petroleum resin containing the hydrogenated low-molecular weight material.

The molecular weight of the hydrogenated low-molecular weight material was measured by means of GC-MS. As a result, peaks were detected in a molecular weight range of 200 to 350.

Furthermore, the hydrogenated petroleum resin obtained in Comparative Example 2 was measured for the following physical properties. As a result, the following results were obtained.

Softening point: 101° C. (applied with the provisions of JIS K2207:2006)

Vinyl aromatic compound unit content: 21.5% by mass (quantitatively determined with infrared spectrophotometer (absorbance: 700 cm$^{-1}$))

Bromine number: 5.5 g/100 g (applied with the provisions of JIS K2605:1996)

Number average molecular weight (Mn): 680 (GPC measurement method; column: TSK Gel G200H$_{XL}$ & G4000H$_{XL}$, flow rate: 1 mL/min, eluant: THF, temperature: 40° C.)

With respect to the hydrogenated petroleum resins obtained in the aforementioned Examples 1 to 2 and Comparative Examples 1 to 2, "(1-1) Quantitative Determination of Ethylcyclohexane as the Volatile Organic Compound Component" and "(2) Evaluation of odor" were performed by the following method. The results are summarized in Table 1.

[Test Method]
(1-1) Quantitative Determination of Ethylcyclohexane as the Volatile Organic Compound Component 0.500 g of each of the hydrogenated petroleum resins obtained in Examples 1 to 2 and Comparative Examples 1 to 2 was dissolved in 5.00 mL of chloroform, to prepare a measurement sample.

The quantitative determination of ethylcyclohexane was performed with a gas chromatograph ("Agilent 6850", manufactured by Agilent Technologies, Inc.) under the following measurement condition taking this measurement sample as an object.

<Measurement Condition>
Column: HP-1 (30 m×0.25 mm, film thickness: 0.25 μm)
Oven temperature: temperature rise from 50° C. (0 min) to 350° C. (10 min) at a rate of 10° C./min
Injection temperature: 250° C.
Detection temperature: 300° C.
Detector: FID
Carrier gas: He
Linear velocity: 40 cm/sec
Injection amount: 1.0 μL
Split: 1/10

(1-2) Quantitative Determination of Hydrogenated Low-Molecular Weight Material

The quantitative determination of the hydrogenated low-molecular weight material was performed with a gas chromatograph in conformity with the quantitative determination method of the aforementioned "(1-1) Quantitative Determination of Ethylcyclohexane as the Volatile Organic Compound Component".

(2) Evaluation of Odor

60% by mass of each of the hydrogenated petroleum resins obtained in Examples 1 to 2 and Comparative Examples 1 to 2 and the following blending components were kneaded in blending amounts as shown below, to prepare a hot melt adhesive. 1 g of each of the prepared hot melt adhesives was used as a sample for evaluation test of odor.

<Blending Components of Hot Melt Adhesive Composition>

Base polymer (trade name: Clayton D1102JSZ): 25% by mass
Oil (trade name: PS32): 15% by mass
Antioxidant (trade name: Irganox 1010): 1% by mass This sample was charged in a 200-mL Erlenmeyer flask; an opening of the flask was covered with an aluminum foil to be tightly sealed; and the sample was heated at a temperature of 160° C. for 1 hour and then cooled to room temperature, thereby preparing an objective sample to the evaluation of odor.

The thus prepared four objective samples were subjected to an organoleptic test with six panels and judged by the respective panels according to the following five grades. The values obtained through the judgement by the six panels were totalized and then averaged, thereby evaluating the odor.

0: Odorless
1: Odor that can finally be sensed
2: Odor that can tell what kind of odor
3: Odor that can be easily sensed
4: Strongly perceived odor
5: Very strong odor It can be evaluated that the lower the average of the totalized judgement values, the more excellent in the low odor properties.

TABLE 1

| | Content of ethylcyclohexane (wt ppm) | Evaluation of odor (average of totalized judgement values) |
|---|---|---|
| Example 1 | 2 | 2.5 |
| Example 2 | 0 | 2.4 |
| Comparative Example 1 | 1300 | 3.5 |
| Comparative Example 2 | 600 | 3.6 |

SUMMARY OF RESULTS

From the results shown in Table 1, it has been noted that in Comparative Examples 1 to 2, the low odor properties are inferior in the evaluation test of odor owing to the use of the hydrogenated petroleum resin in which the content of the ethylcyclohexane as the volatile organic compound component is more than the range prescribed in the present invention.

In contrast, it has been noted that in Examples 1 to 2, the low odor properties are excellent in the evaluation test of odor owing to the use of the hydrogenated petroleum resin in which the content of the ethylcyclohexane as the volatile organic compound component satisfies the range prescribed in the present invention.

The invention claimed is:

1. A method for producing a hydrogenated petroleum resin comprising:
   a copolymerization reaction step of subjecting a cyclopentadiene-based compound and a vinyl aromatic compound to a copolymerization reaction in the presence of a polymerization solvent;
   a step of performing a removal treatment of a volatile component which is contained in a copolymerization reaction product liquid obtained in the copolymerization reaction step, to obtain a petroleum resin;
   a hydrogenation reaction step of subjecting the petroleum resin to a hydrogenation reaction in the presence of a hydrogenation solvent;
   a step of performing a removal treatment of an unreacted component and a volatile component which are contained in a hydrogenation reaction product liquid obtained in the hydrogenation reaction step, to obtain a hydrogenated petroleum resin concentrate; and
   a removal step of a volatile organic compound component by removing a volatile organic compound component from the hydrogenated petroleum resin concentrate, to obtain a hydrogenated petroleum resin containing 6 to 10% by mass of a hydrogenated low-molecular weight material having a molecular weight of 200 to 350,
   wherein the removal step of a volatile organic compound component is constituted of a first step of supplying the hydrogenated petroleum resin into a thin film distillation apparatus, to control the content of the volatile organic compound component to less than 2,000 wt ppm; and a second step of supplying the hydrogenated petroleum resin having passed the first step into a nitrogen-stripping apparatus or a steam distillation apparatus, to control the content of the volatile organic compound component to less than 100 wt ppm.

2. The method for producing a hydrogenated petroleum resin according to claim 1, wherein the content of the hydrogenated low-molecular weight material which is contained in the hydrogenated petroleum resin in the hydrogenated petroleum resin concentrate is 7 to 13% by mass in 100% by mass of the hydrogenated petroleum resin containing the hydrogenated low molecular material.

3. The method for producing a hydrogenated petroleum resin according to claim 1, wherein in the thin film distillation apparatus, a treatment temperature is 100 to 300° C., a treatment pressure is 0.1 to 15 kPa, and a treatment time is 5 to 180 minutes.

4. The method for producing a hydrogenated petroleum resin according to claim 1, wherein in the nitrogen-stripping apparatus or the steam distillation apparatus, a treatment temperature is 150 to 300° C., a treatment pressure is 0.5 to 150 kPa, a nitrogen or steam flow rate is 100 to 1,000,000 mL/mite relative to 100% by mass of the hydrogenated petroleum resin, and a treatment time is 10 to 180 minutes.

5. The method for producing a hydrogenated petroleum resin according to claim 1, wherein the nitrogen-stripping apparatus is a rotary evaporator or a flash drum, and the steam distillation apparatus is a flash drum or a stripping tower.

* * * * *